(12) United States Patent
Takahashi

(10) Patent No.: US 9,860,506 B2
(45) Date of Patent: Jan. 2, 2018

(54) COLOR PROCESSING APPARATUS AND METHOD THEREFOR

(71) Applicant: CANON KABUSHIKI KAISHA, Tokyo (JP)

(72) Inventor: Kosei Takahashi, Kawasaki (JP)

(73) Assignee: CANON KABUSHIKI KAISHA, TOKYO (JP)

( * ) Notice: Subject to any disclaimer, the term of this patent is extended or adjusted under 35 U.S.C. 154(b) by 0 days.

(21) Appl. No.: 15/173,928

(22) Filed: Jun. 6, 2016

(65) Prior Publication Data

US 2016/0360175 A1    Dec. 8, 2016

(30) Foreign Application Priority Data

Jun. 8, 2015    (JP) ................. 2015-116021

(51) Int. Cl.
| H04N 9/67 | (2006.01) |
| H04N 1/60 | (2006.01) |
| H04N 9/64 | (2006.01) |
| H04N 9/82 | (2006.01) |
| H04N 9/73 | (2006.01) |

(52) U.S. Cl.
CPC .......... *H04N 9/735* (2013.01); *H04N 1/6027* (2013.01); *H04N 9/67* (2013.01)

(58) Field of Classification Search
CPC .......... H04N 9/735; H04N 9/67; H04N 9/793; H04N 9/825; H04N 9/8722; H04N 9/646; H04N 9/643; H04N 1/60; H04N 1/6005; H04N 1/6027; H04N 19/186

USPC ............. 348/182, 587, 582, 592, 29, 30, 32, 348/210.99, 223.1, 222.1, 221.1, 242; 382/162, 167; 358/518
See application file for complete search history.

(56) References Cited

U.S. PATENT DOCUMENTS

| 8,947,549 B2 * | 2/2015 | Gish .................. H04N 1/60 348/218.1 |
| 9,077,942 B2 | 7/2015 | Gish et al. |
| 2009/0196494 A1 * | 8/2009 | Kanai ................ G06T 11/001 358/1.9 |

(Continued)

FOREIGN PATENT DOCUMENTS

WO    2013101639 A1    7/2013

*Primary Examiner* — Lin Ye
*Assistant Examiner* — Marily Camargo
(74) *Attorney, Agent, or Firm* — Rossi, Kimms & McDowell LLP

(57) ABSTRACT

This invention converts input color data into output color data using a table which has been created based on spectral data generated by an appropriate generation method and indicates the correspondence between an input chromaticity and an output chromaticity. To do this, an input color data acquisition unit converts input color data into input chromaticity data. An output chromaticity data calculating unit converts the input chromaticity data into output chromaticity data by referring to an LUT indicating the correspondence between an input chromaticity and an output chromaticity. An output color data calculating unit converts the output chromaticity data into output color data using a conversion coefficient calculated from the input color data. The table indicating the correspondence is created based on spectral data generated by a generation method different for each of a low chroma color and a high chroma color.

13 Claims, 11 Drawing Sheets

(56) References Cited

U.S. PATENT DOCUMENTS

2014/0022410 A1\* 1/2014 Gish .................. G01J 3/46
 315/153
2015/0022685 A1\* 1/2015 Gish .................. H04N 1/60
 348/223.1

\* cited by examiner

—— FIRST MAIN COMPONENT    ····· SECOND MAIN COMPONENT    ‑ ‑ ‑ THIRD MAIN COMPONENT

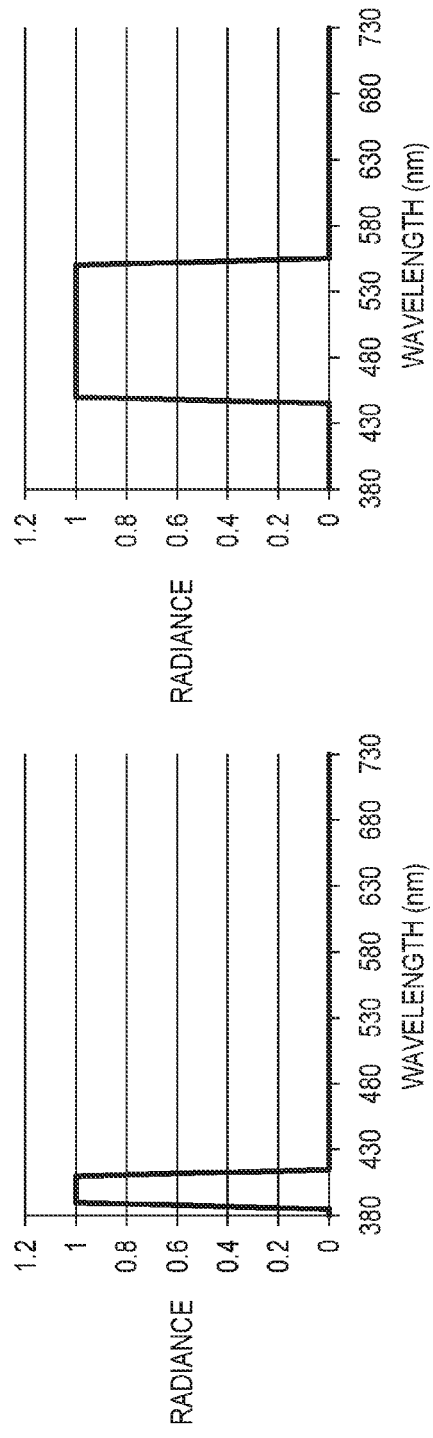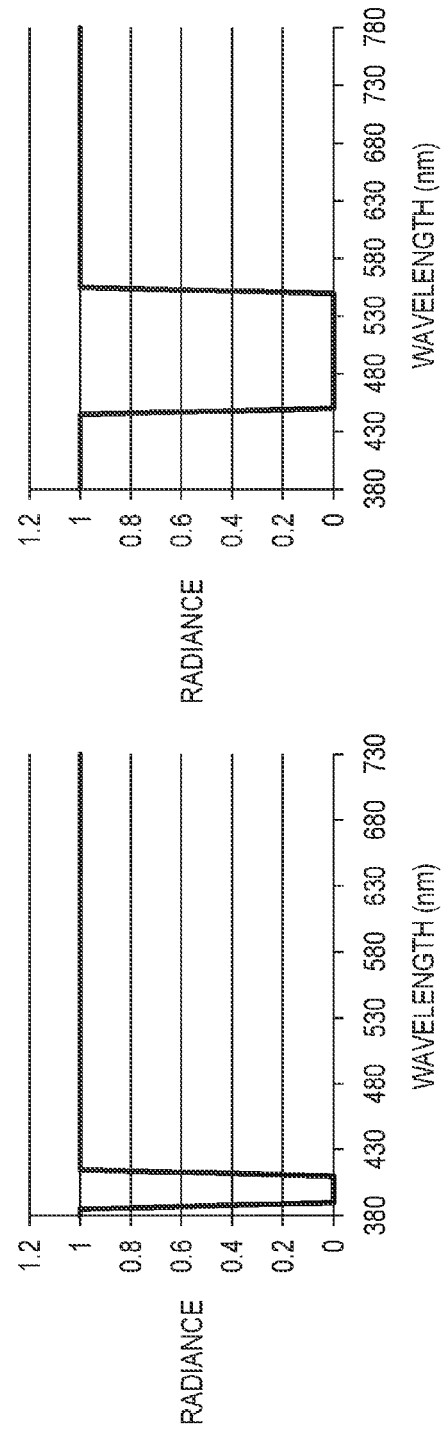

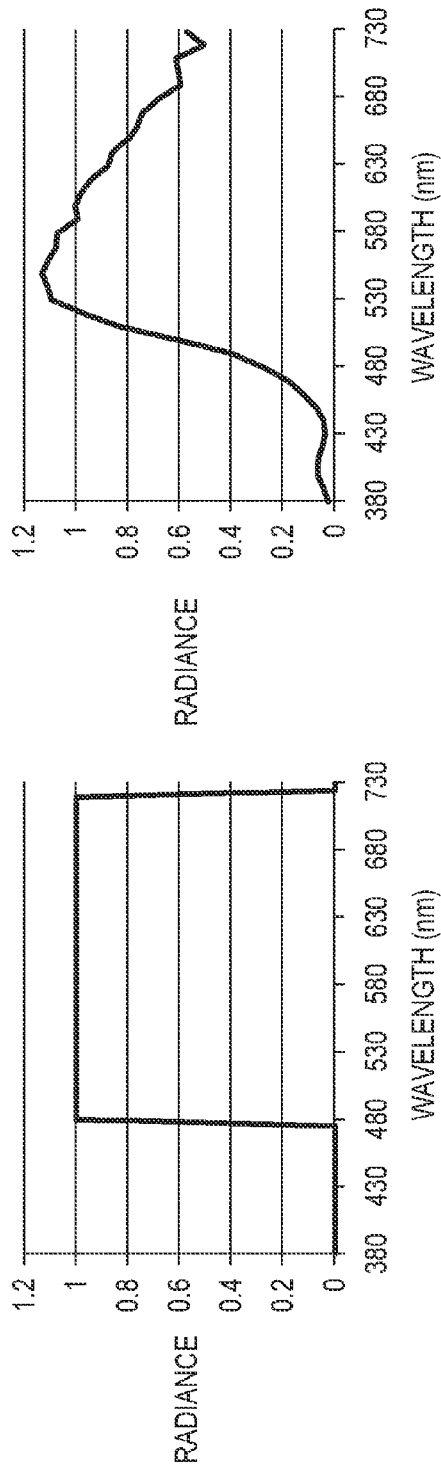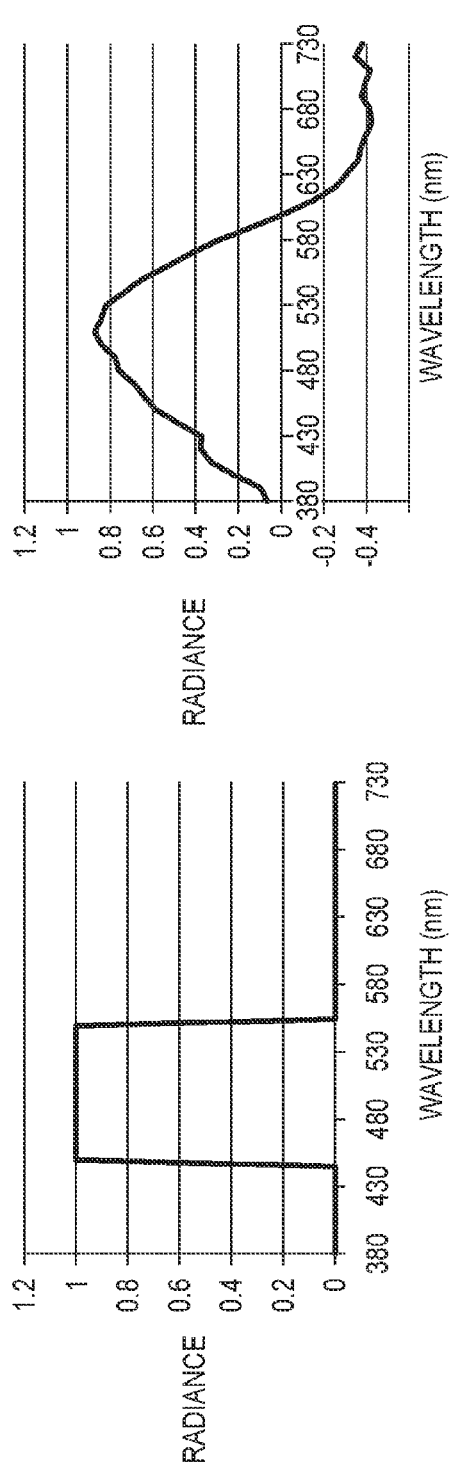

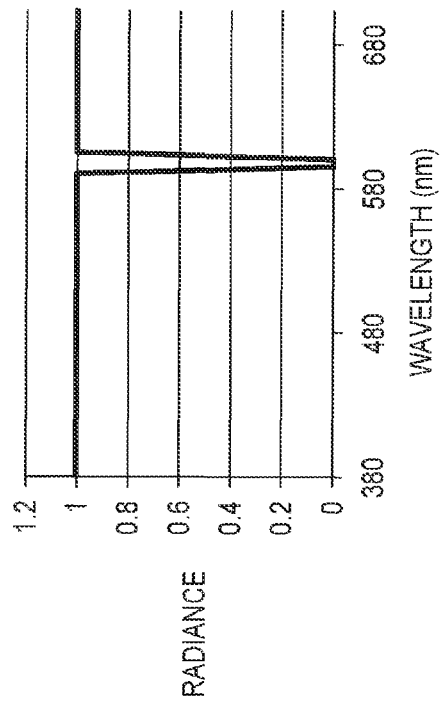
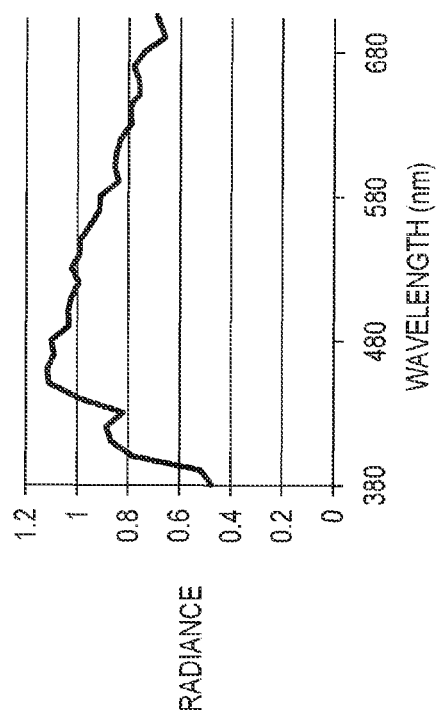
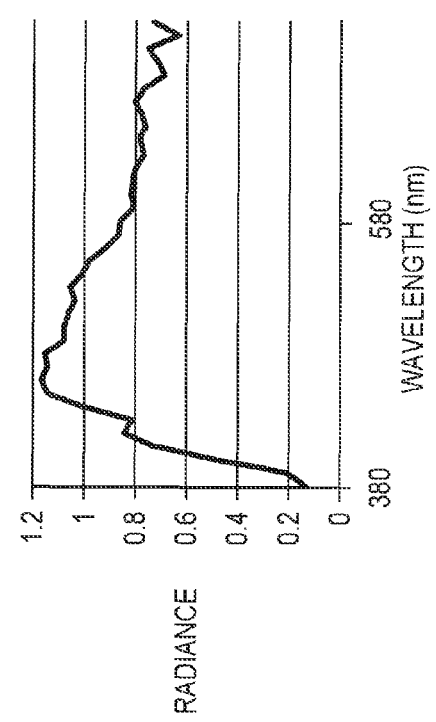

COLOR PROCESSING APPARATUS AND METHOD THEREFOR

BACKGROUND OF THE INVENTION

Field of the Invention

The present invention relates to color conversion processing of image data acquired by an image input device.

Description of the Related Art

The spectral characteristics of the color filters of an image input device represented by a digital camera do not generally coincide with human visual spectral characteristics (color-matching functions). The RGB values of image data captured by an image input device are values (to be referred to as device-dependent values hereinafter) depending on the characteristics of the image input device. It is, therefore, necessary to convert the RGB values as device-dependent values into tristimulus values (XYZ values) serving as device-independent color signals or into standard RGB values in an sRGB space, an AdobeRGB space, or the like. For example, there is known a method of converting RGB values into tristimulus values by matrix calculation.

However, in matrix calculation, no high-accuracy conversion is performed especially for a high chroma color, thereby degrading the color conversion accuracy. To cope with this, for example, International Publication No. 2013/101639 discloses a method of performing high-accuracy color conversion processing in the entire visible light range by calculation using a lookup table (LUT) instead of matrix calculation when converting RGB values into XYZ values.

In a technique disclosed in International Publication No. 2013/101639, to create an LUT to be used for color conversion, grid points are arranged in the entire visible light range, and spectral data corresponding to each grid point is generated. After that, RGB values and XYZ values for the spectral data of each grid point are calculated and the correspondence between the RGB values and the XYZ values is recorded in the LUT.

According to International Publication No. 2013/101639, as spectral data corresponding to each grid point, data (to be referred to as rectangular spectral data hereinafter) having spectral characteristics (to be referred to as rectangular spectral characteristics hereinafter) of a rectangular wave shape in which the strength is 0 in a given wavelength range and constant strength is obtained in the remaining wavelength range is used. The rectangular spectral characteristics cannot sufficiently express the spectral characteristics of an existing object. Especially, the spectral characteristics of a low chroma object are largely different from the rectangular spectral characteristics. Therefore, if color conversion is performed by an LUT created using the rectangular spectral data, the conversion accuracy of an object having spectral characteristics different from the rectangular spectral characteristics deteriorates.

SUMMARY OF THE INVENTION

The present invention has been made in consideration of the above problem. This specification provides a technique of converting input color data into output color data using a table which has been created based on spectral data generated by an appropriate generation method and indicates the correspondence between an input chromaticity and an output chromaticity.

This specification also provides a technique of creating a table indicating the correspondence between an input chromaticity and an output chromaticity based on spectral data generated by an appropriate generation method.

According to an aspect of the invention, there is provided a color processing apparatus comprising: a first convertor configured to convert input color data into input chromaticity data; a second convertor configured to convert the input chromaticity data into output chromaticity data by referring to a table indicating a correspondence between an input chromaticity and an output chromaticity; and a third convertor configured to convert the output chromaticity data into output color data using a conversion coefficient calculated from the input color data, wherein the table indicating the correspondence is created based on spectral data generated by a generation method different for each of a low chroma color and a high chroma color.

According to the present invention, it is possible to convert input color data into output color data using a table which has been created based on spectral data generated by an appropriate generation method and indicates the correspondence between an input chromaticity and an output chromaticity.

It is also possible to create a table indicating the correspondence between an input chromaticity and an output chromaticity based on spectral data generated by an appropriate generation method.

Further features of the present invention will become apparent from the following description of exemplary embodiments (with reference to the attached drawings).

BRIEF DESCRIPTION OF THE DRAWINGS

FIGS. 6A to 6D are graphs respectively showing examples of rectangular spectral characteristics;

FIGS. 7A to 7D are graphs respectively showing examples of the spectral characteristics of rectangular spectral data and main component spectral data;

FIGS. 10A to 10C are graphs for explaining an example of converting, using an LUT, standard light (illuminant D65) defined by the International Commission on Illumination.

DESCRIPTION OF THE EMBODIMENTS

A color processing apparatus and color processing method according to embodiments of the present invention will be described in detail below with reference to the accompanying drawings. Note that the embodiments are not intended to limit the present invention to the scope of the claims, and not all of the combinations of arrangements set forth in the embodiments are necessarily required with respect to the means to solve the problems according to the present invention.

First Embodiment

Arrangement of Apparatus

Figure 1:
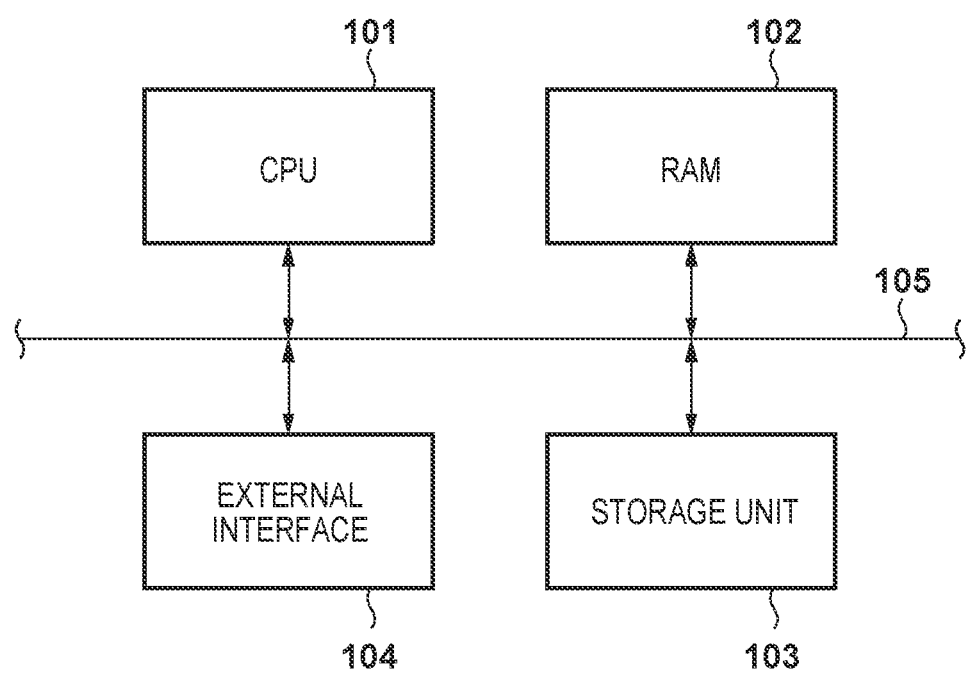
FIG. 1 is a block diagram showing an example of the arrangement of an information processing apparatus functioning as a color processing apparatus according to embodiments.

FIG. 1 is a block diagram showing an example of the arrangement of an information processing apparatus functioning as a color processing apparatus according to the first embodiment. A CPU 101 controls the overall apparatus by executing an OS and various programs stored in a storage unit 103 including a ROM and a flash memory using a RAM 102 as a work memory. The programs stored in the storage unit 103 include a program and data for color conversion processing (to be described later).

An external interface (external I/F) 104 is a communication interface for connection to an external apparatus (for example, an image input device and various storage devices). As the external I/F 104, a serial bus interface such as USB, eSATA, or Thunderbolt or a wireless network interface such as Wi-Fi® or Bluetooth® can be used. An interconnect 105 is a data transfer line formed by a common bus, switches, and the like between the CPU 101, RAM 102, storage unit 103, and external I/F 104.

The CPU 101 stores, in the RAM 102, data externally input to the external I/F 104, and processes the data stored in the RAM 102. After that, the CPU 101 outputs the data after the processing to, for example, a storage device via the external I/F 104. Note that the data before the processing can be output to the storage device via the external I/F 104.

[Processing Arrangement]

Figure 2:
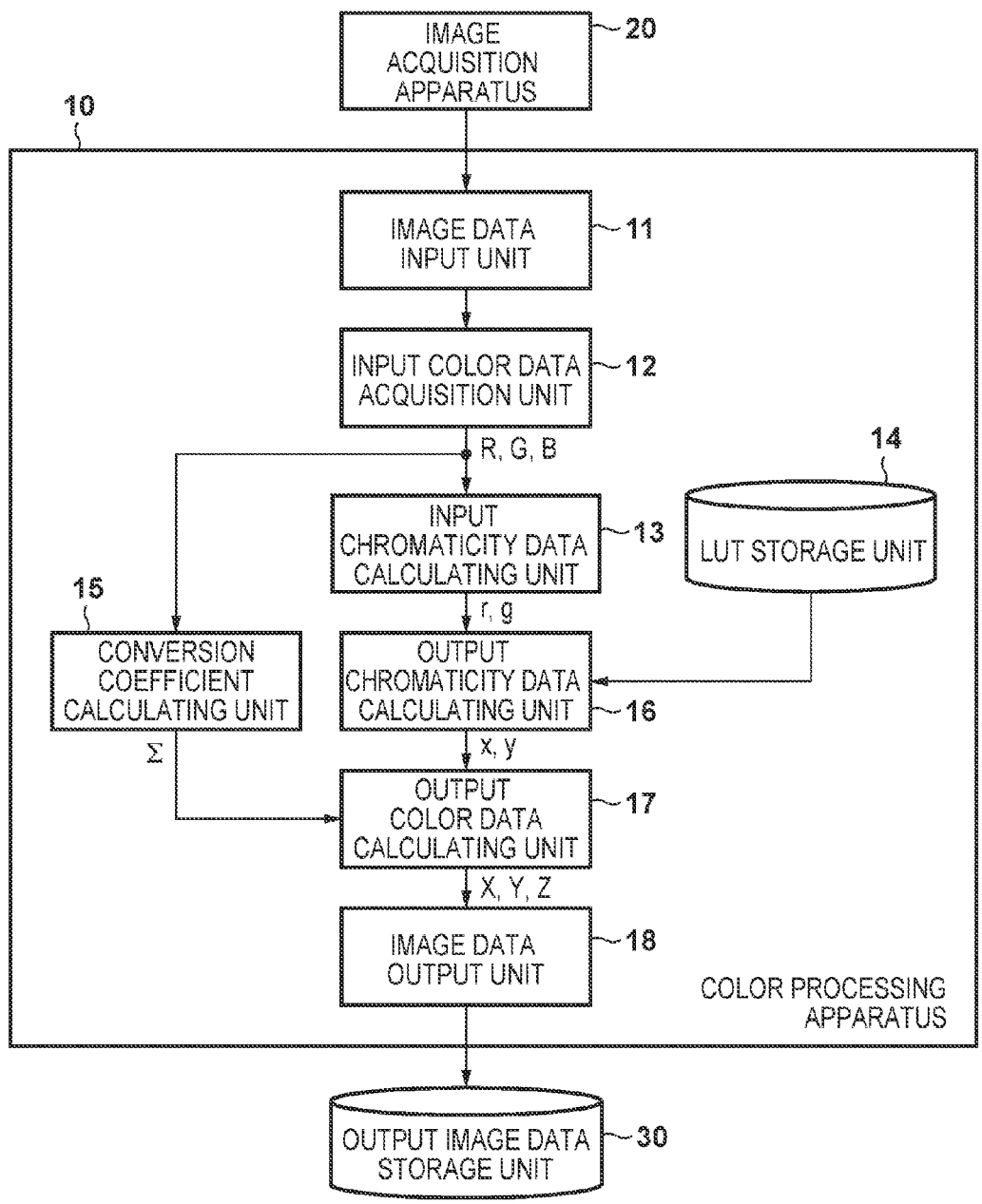
FIG. 2 is a block diagram for explaining an example of the processing arrangement of a color processing apparatus according to the first embodiment.

An example of the processing arrangement of a color processing apparatus according to the first embodiment will be described with reference to a block diagram shown in FIG. 2. When the CPU 101 shown in FIG. 1 executes the program for color conversion processing, a color processing apparatus 10 shown in FIG. 2 is implemented. The color processing apparatus 10 performs color conversion processing of the embodiment for image data input from an image acquisition apparatus 20 which acquires an image of a digital camera or the like.

In the color processing apparatus 10, an image data input unit 11 inputs image data acquired by the image acquisition apparatus 20. An input color data acquisition unit 12 acquires three-dimensional input color data of each pixel of the image data input by the image data input unit 11. An input chromaticity data calculating unit 13 calculates two-dimensional chromaticity data (to be referred to as input chromaticity data hereinafter) from the input color data.

An LUT storage unit 14 stores an LUT to be used to convert input chromaticity data into output chromaticity data. A conversion coefficient calculating unit 15 calculates a conversion coefficient using the three-dimensional input color data output from the input color data acquisition unit 12. An output chromaticity data calculating unit 16 converts the input chromaticity data output from the input chromaticity data calculating unit 13 into output chromaticity data based on the lookup table (to be referred to as the LUT 14 hereinafter) stored in the LUT storage unit 14.

An output color data calculating unit 17 calculates output color data using the output chromaticity data output from the output chromaticity data calculating unit 16 and the conversion coefficient output from the conversion coefficient calculating unit 15. An image data output unit 18 generates output image data based on the output color data output from the output color data calculating unit 17, and outputs the generated data. The output image data is stored in, for example, an output image data storage unit 30.

Note that the LUT 14 is arranged in the storage unit 103 shown in FIG. 1. Furthermore, a connection unit between the image data input unit 11 an the image acquisition apparatus 20 and a connection unit between the image data output unit 18 and the output image data storage unit 30 correspond to the external I/F 104 shown in FIG. 1.

[Color Conversion Processing]

Figure 3:
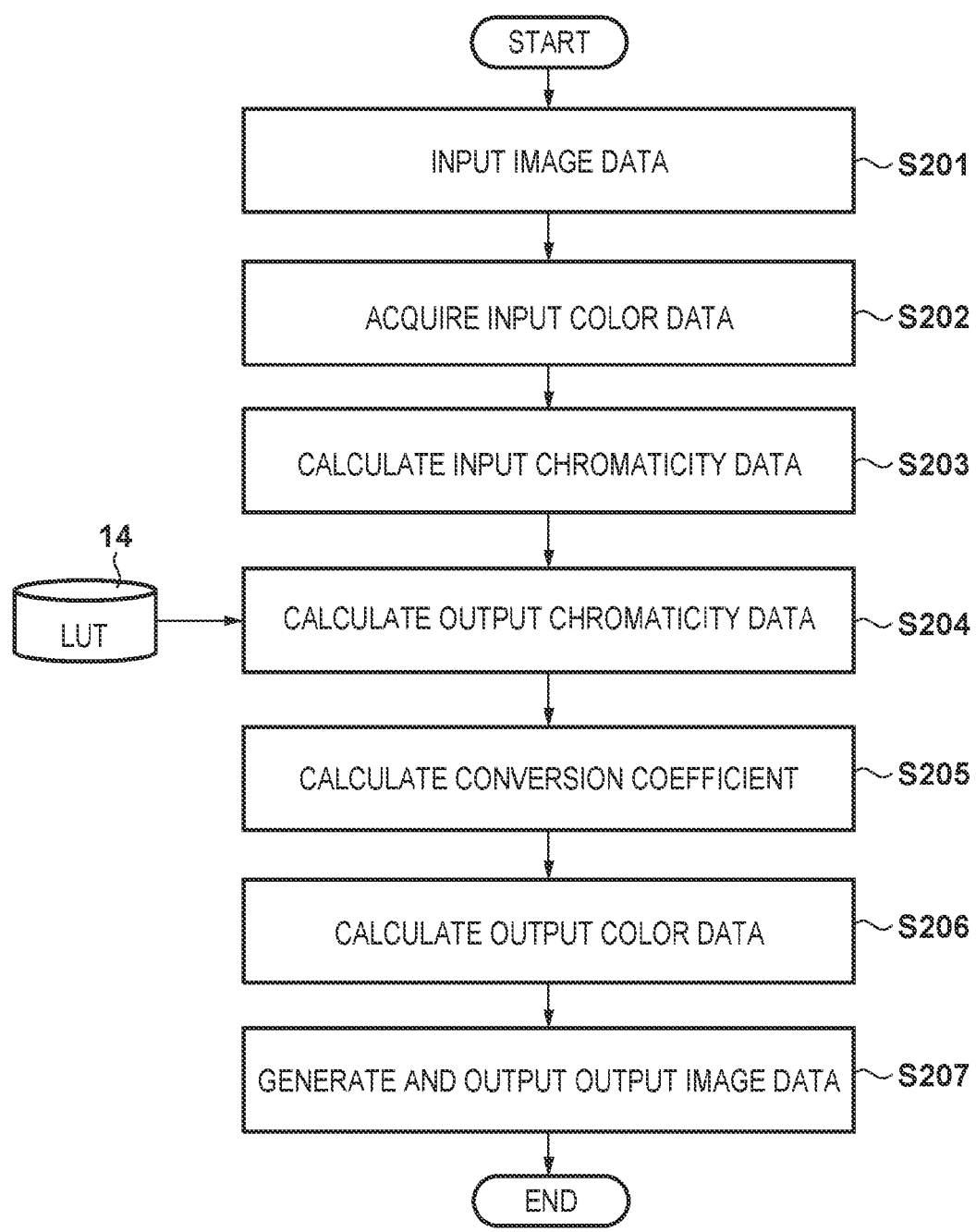
FIG. 3 is a flowchart for explaining color conversion processing executed by the color processing apparatus according to the first embodiment.

Color conversion processing executed by the color processing apparatus 10 according to the first embodiment will be described with reference to a flowchart shown in FIG. 3. Note that the CPU 101 creates the LUT 14 in advance, and details thereof will be described later.

The image data input unit 11 inputs image data acquired by the image acquisition apparatus 20 (step S201). The input color data acquisition unit 12 acquires three-dimensional input color data (R, G, B) of each pixel of the input image data (step S202). The input chromaticity data calculating unit 13 calculates two-dimensional chromaticity data (r, g) from the three-dimensional input color data by:

$$r=R/(R+G+B);$$

$$g=G/(R+G+B); \quad (1)$$

The output chromaticity data calculating unit 16 performs the interpolation operation of output chromaticity data (x, y) from the input chromaticity data based on the LUT 14 (step S203). The conversion coefficient calculating unit 15 calculates a conversion coefficient Σ from the input color data by:

$$\Sigma=R+G+B; \quad (2)$$

Next, the output color data calculating unit 17 calculates output color data from the output chromaticity data and the conversion coefficient (step S204) by:

$$X=x\cdot\Sigma;$$

$$Y=y\cdot\Sigma;$$

$$Z=(1-x-y)\cdot\Sigma; \quad (3)$$

Note that this embodiment will describe an example of calculating, as output color data, XYZ values serving as tristimulus values.

The image data output unit 18 generates output image data based on the output color data, and outputs the generated data (step S205). The output image data is stored in, for example, the output image data storage unit 30.

Note that the example of calculating the XYZ values as the output color data has been explained above. However, the present invention is not limited to this. For example, RGB values in a generally defined color space such as an sRGB or AdobeRGB space may be output as output color data. XYZ values can be calculated as output color data, converted into RGB values defined in the standard color space by a general definitional equation, an ICC profile, or the like, and then output as output image data.

Creation of LUT

Figure 4A:
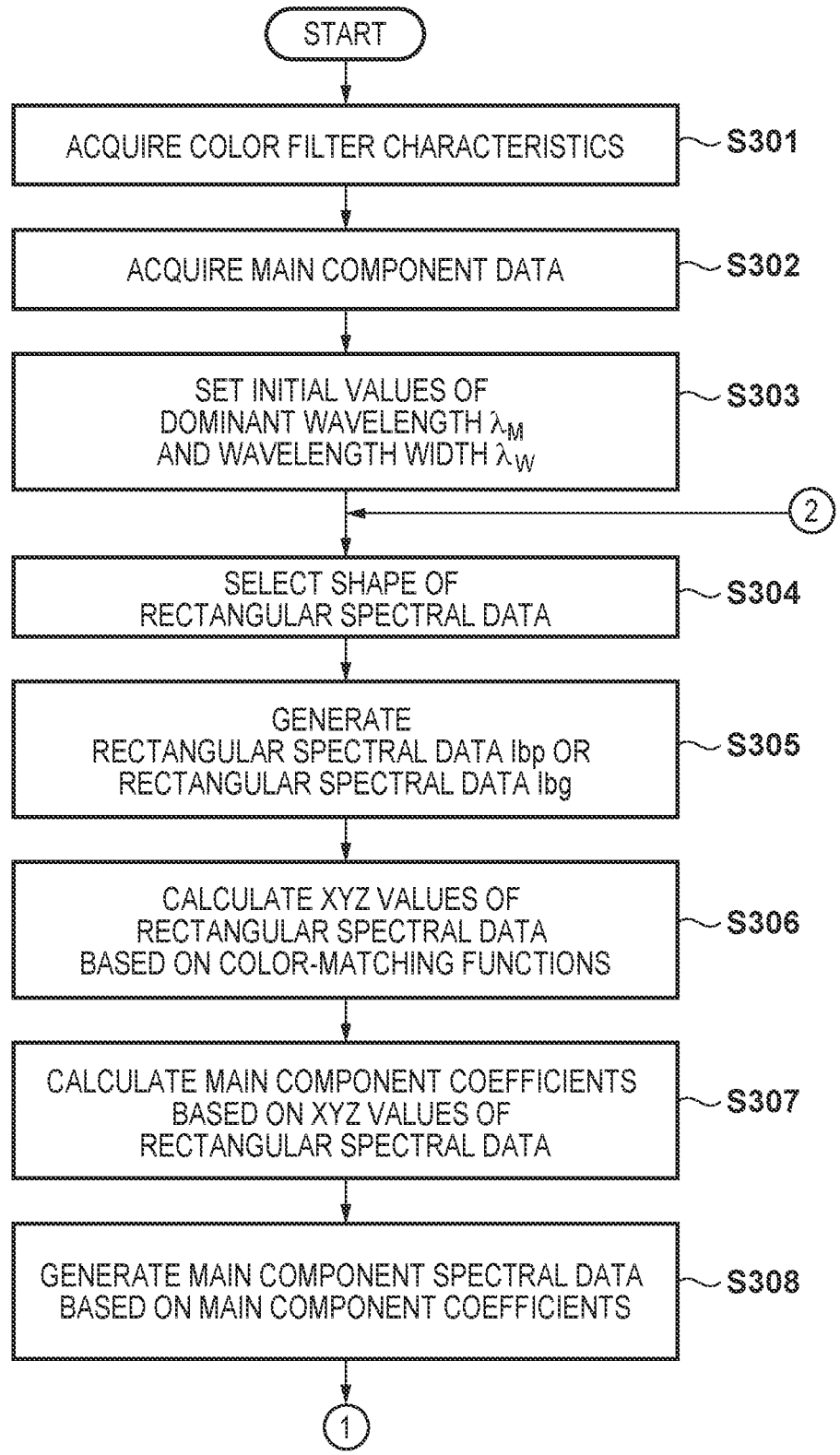
FIGS. 4A and 4B are flowcharts for explaining creation of an LUT.
Figure 4B:
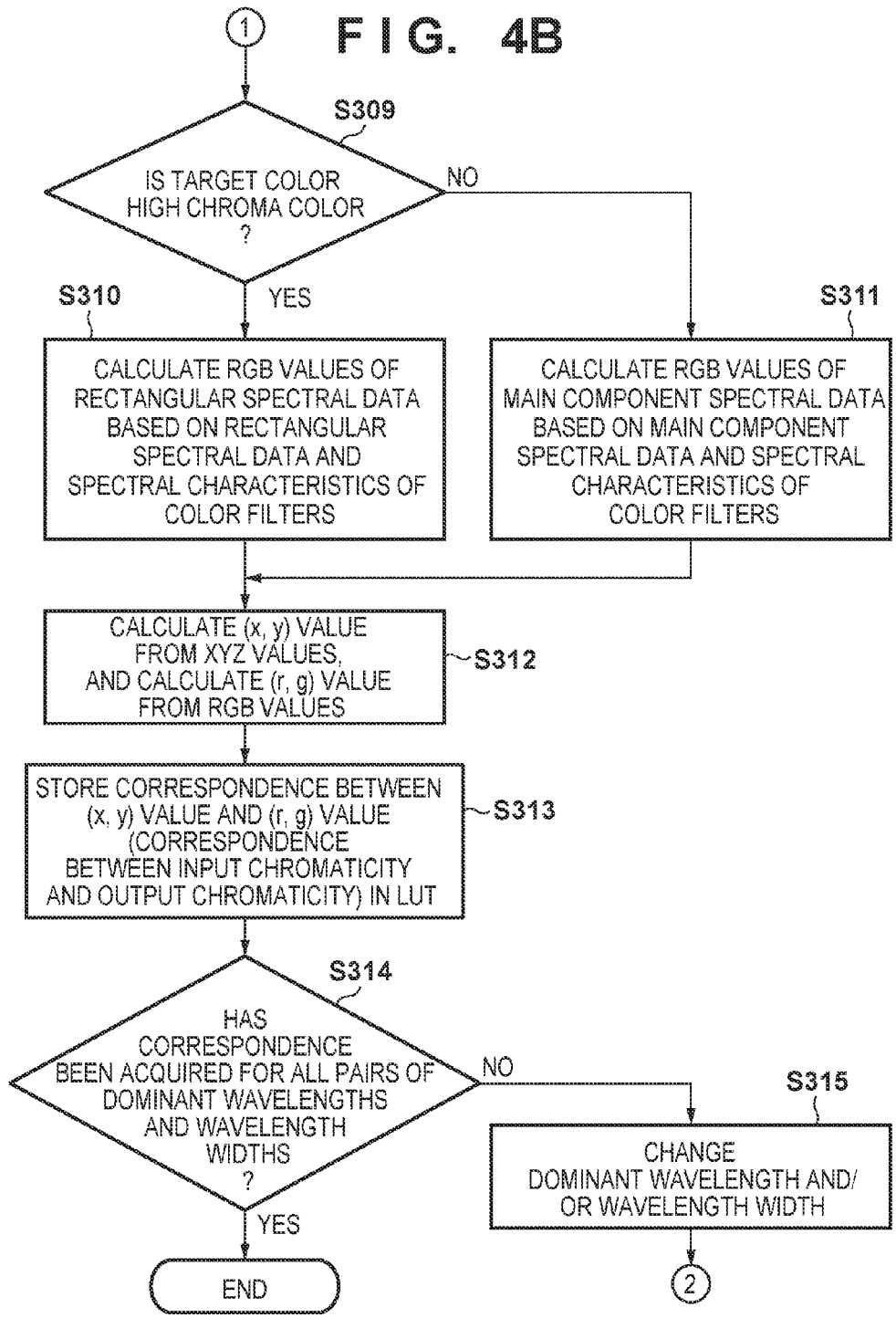
Figure 5A:
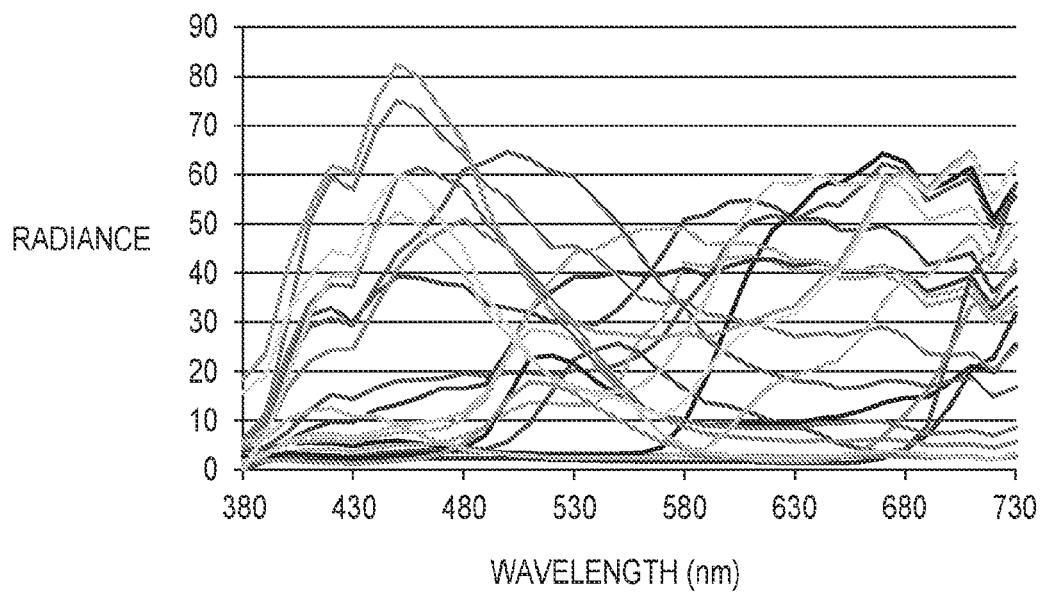
FIG. 5A is a graph showing an example of spectral characteristic data group for calculating main components.
Figure 5B:
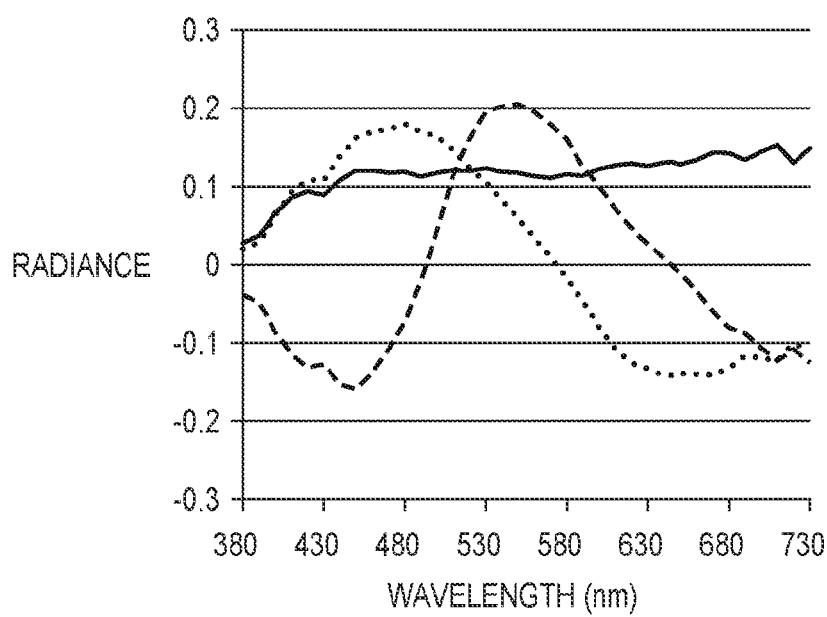
FIG. 5B is a graph showing examples of main component data of the first to third main components.

Creation of the LUT 14 will be described with reference to flowcharts shown in FIGS. 4A and 4B. The CPU 101 acquires the RGB color filter characteristics of the image acquisition apparatus 20 (step S301), and acquires main component data of the first to third main components which are obtained by performing main component analysis for a plurality of spectral data (to be referred to as a spectral characteristic data group hereinafter) prepared in advance (step S302). FIG. 5A shows an example of the spectral characteristic data group for calculating main components, and FIG. 5B shows examples of the main component data of the first to third main components.

The CPU 101 sets the initial values of a dominant wavelength $\lambda_M$ and a wavelength width $\lambda_W$ which are parameters necessary to generate rectangular spectral data (step S303), and selects the shape (a parameter indicating a bandpass or band gap type) of rectangular spectral data to be generated (step S304).

The CPU 101 generates bandpass type rectangular spectral data Ibp or band gap type rectangular spectral data Ibg based on $\lambda_M$ and $\lambda_W$ (step S305) by:

$$\text{if (bandpass type) \{} \qquad (4)$$
$$\text{if } (|\lambda - \lambda_M| \leq \lambda_W)$$
$$\text{Ibp}(\lambda) = 1;$$
$$\text{else}$$
$$\text{Ibp}(\lambda) = 0;$$
$$\}$$
$$\text{if (band gap type) \{}$$
$$\text{if } (|\lambda - \lambda_M| > \lambda_W)$$
$$\text{Ibg}(\lambda) = 1;$$
$$\text{else}$$
$$\text{Ibg}(\lambda) = 0;$$
$$\}$$

Note that which type of rectangular spectral data is to be generated is determined in accordance with parameter selection in step S304.

FIGS. 6A to 6D respectively show examples of the rectangular spectral characteristics. FIG. 6A shows the rectangular spectral characteristics of the bandpass type rectangular spectral data Ibp of $\lambda_M$=400 nm and $\lambda_W$=10 nm, and FIG. 6B shows the rectangular spectral characteristics of the bandpass type rectangular spectral data Ibp of $\lambda_M$=500 nm and $\lambda_W$=50 nm. On the other hand, FIG. 6C shows the rectangular spectral characteristics of the band gap type rectangular spectral data Ibg of $\lambda_M$=400 nm and $\lambda_W$=10 nm, and FIG. 6D shows the rectangular spectral characteristics of the band gap type rectangular spectral data Ibg of $\lambda_M$=500 nm and $\lambda_W$=50 nm. Note that if the bandpass type is selected and $\lambda_W$=0 nm, Ibp represents single-wavelength spectral light.

The CPU 101 calculates the XYZ values of the generated rectangular spectral data based on color-matching functions generally used (step S306), by:

$$X = k\int_{vis} I(\lambda)x(\lambda)d\lambda;$$

$$Y = k\int_{vis} I(\lambda)y(\lambda)d\lambda;$$

$$Z = k\int_{vis} I(\lambda)z(\lambda)d\lambda; \qquad (5)$$

where $\int_{vis} d\lambda$ represents the integral in a visible light wavelength range, $I(\lambda)$ represents Ibp($\lambda$) or Ibg($\lambda$), and $x(\lambda)$, $y(\lambda)$, and $z(\lambda)$ represent the color-matching functions.

The CPU 101 calculates main component coefficients based on the XYZ values of the rectangular spectral data (step S307) by:

$$[a \ b \ c] = [X_I \ Y_I \ Z_I] \begin{bmatrix} X_{e1} & X_{e2} & X_{e3} \\ Y_{e1} & Y_{e2} & Y_{e3} \\ Z_{e1} & Z_{e2} & Z_{e3} \end{bmatrix}^{-1} \qquad (6)$$

where $[X_I \ Y_I \ Z_I]$ represent the XYZ values of the rectangular spectral data, and $[X_{eN} \ Y_{eN} \ Z_{eN}]$ represent the XYZ values of the Nth main component. The calculated main component coefficients are coefficients used to calculate spectral data having XYZ values equal to those of the rectangular spectral data by the linear sum of the main components.

The CPU 101 generates spectral data (to be referred to as main component spectral data hereinafter) $S(\lambda)$ by the linear sum of the main components based on the main component coefficients (step S308) by:

$$S(\lambda) = a \cdot e_1(\lambda) + b \cdot e_2(\lambda) + c \cdot e_3(\lambda); \qquad (7)$$

where $e_N(\lambda)$ represents the Nth main component data.

The CPU 101 determines whether a color (target color) represented by the XYZ values is a high chroma color or low chroma color (step S309). This determination is performed to create, using the rectangular spectral data, data to be stored in the LUT if the color is a high chroma color, and create the data using the main component spectral data if the color is a low chroma color. That is, it is determined whether the main component spectral data takes a negative value in the visible light wavelength range. If the main component spectral data takes a negative value, it is determined that the target color is a high chroma color, and the process advances to step S310. If the main component spectral data takes not a negative value but zero or a positive value in the visible light wavelength range, it is determined that the target color is a low chroma color, and the process advances to step S311.

FIGS. 7A to 7D respectively show examples of the spectral characteristics of the rectangular spectral data and main component spectral data. FIG. 7A shows the spectral characteristics of the rectangular spectral data generated under the conditions of the bandpass type, $\lambda_M$=600 nm, and $\lambda_W$=120 nm. FIG. 7B shows the spectral characteristics of the main component spectral data which has been calculated using the main component coefficients [a b c] and has XYZ values equal to those of the rectangular spectral data shown in FIG. 7A. Similarly, FIG. 7C shows the spectral characteristics of the rectangular spectral data generated under the conditions of the bandpass type, $\lambda_M$=500 nm, and $\lambda_W$=50 nm. FIG. 7D shows the spectral characteristics of the main component spectral data which has been calculated using the main component coefficients [a b c] and has XYZ values equal to those in FIG. 7C.

It is determined that the main component spectral data shown in FIG. 7B takes a positive value in the entire visual wavelength range and the target color is a low chroma color, and the process advances to step S311. On the other hand, it is determined that the main component spectral data shown in FIG. 7D takes a negative value in a long wavelength range of 600 nm or more and the target color is a high chroma color for which existing data cannot be obtained by the linear sum of the main components, and the process advances to step S310 to use the rectangular spectral data.

If the rectangular spectral data is used, the CPU 101 calculates RGB values of the rectangular spectral data based on the rectangular spectral data and data indicating the color filter characteristics acquired in step S301 (step S310) by:

$$R = \int_{vis} I(\lambda)r(\lambda)d\lambda;$$

$$G = \int_{vis} I(\lambda)g(\lambda)d\lambda;$$

$$B = \int_{vis} I(\lambda)b(\lambda)d\lambda; \qquad (8)$$

where $I(\lambda)$ represents Ibp($\lambda$) or Ibg($\lambda$), and $r(\lambda)$, $g(\lambda)$, and $b(\lambda)$ respectively represent the spectral characteristics of the color filters.

If the main component spectral data is used, the CPU 101 calculates RGB values of the main component spectral data based on the main component spectral data and the color filter characteristic data (step S311) by:

$$R = \int_{vis} S(\lambda) r(\lambda) d\lambda;$$

$$G = \int_{vis} S(\lambda) g(\lambda) d\lambda;$$

$$B = \int_{vis} S(\lambda) b(\lambda) d\lambda;$$

The CPU 101 calculates an (x, y) value from the XYZ values calculated in step S306 by:

$$x = X/(X+Y+Z);$$

$$y = Y/(X+Y+Z); \quad (10)$$

The CPU 101 calculates an (r, g) value from the RGB values calculated in step S310 or S311 using equations (1) (step S312). The calculated (r, g) value and (x, y) value are stored in the LUT 14 in association with each other (step S313). In other words, a pair of the (r, g) value and (x, y) value (the correspondence between the input chromaticity and the output chromaticity) is data stored in the LUT 14.

The CPU 101 determines whether the correspondence between the input chromaticity and the output chromaticity has been acquired for all pairs of the dominant wavelengths $\lambda_M$ and the predetermined wavelength widths $\lambda_W$ (step S314). If there is a pair of the dominant wavelength $\lambda_M$ and the wavelength width $\lambda_W$ for which the correspondence has not been acquired yet, the CPU 101 changes the dominant wavelength $\lambda_M$ and/or the wavelength width $\lambda_W$ (step S315), and returns the process to step S304. If acquisition of the correspondence between the input chromaticity and the output chromaticity for all the pairs of the dominant wavelengths $\lambda_M$ and the wavelength widths $\lambda_W$ ends, creation of the LUT 14 ends.

Note that the CPU 101 acquires the RGB color filter characteristics from the image acquisition apparatus 20, another computer apparatus, or the like via the external I/F 104. Furthermore, the CPU 101 may acquire the main component data of the first to third main components by performing main component analysis for the spectral characteristic data group stored in advance in the storage unit 103, or acquire the spectral characteristic data group or main component analysis result from the computer apparatus or the like via the external I/F 104. The CPU 101 may acquire data created by an external computer apparatus for executing the processing shown in FIGS. 4A and 4B from the computer apparatus via the external I/F 104, or acquire the data from a server or storage device which holds the data.

As described above, the LUT 14 is created by acquiring the correspondence between the RGB values and the XYZ values using spectral data having different characteristics for each of a high chroma color and low chroma color. Therefore, for example, in color conversion processing in a digital camera, it is possible to improve the color reproduction accuracy over the visible light range.

Second Embodiment

A color processing apparatus and color processing method according to the second embodiment of the present invention will be described below. Note that in the second embodiment, the same reference numerals denote almost the same components as those in the first embodiment and a detailed description thereof may be omitted.

Figure 8:
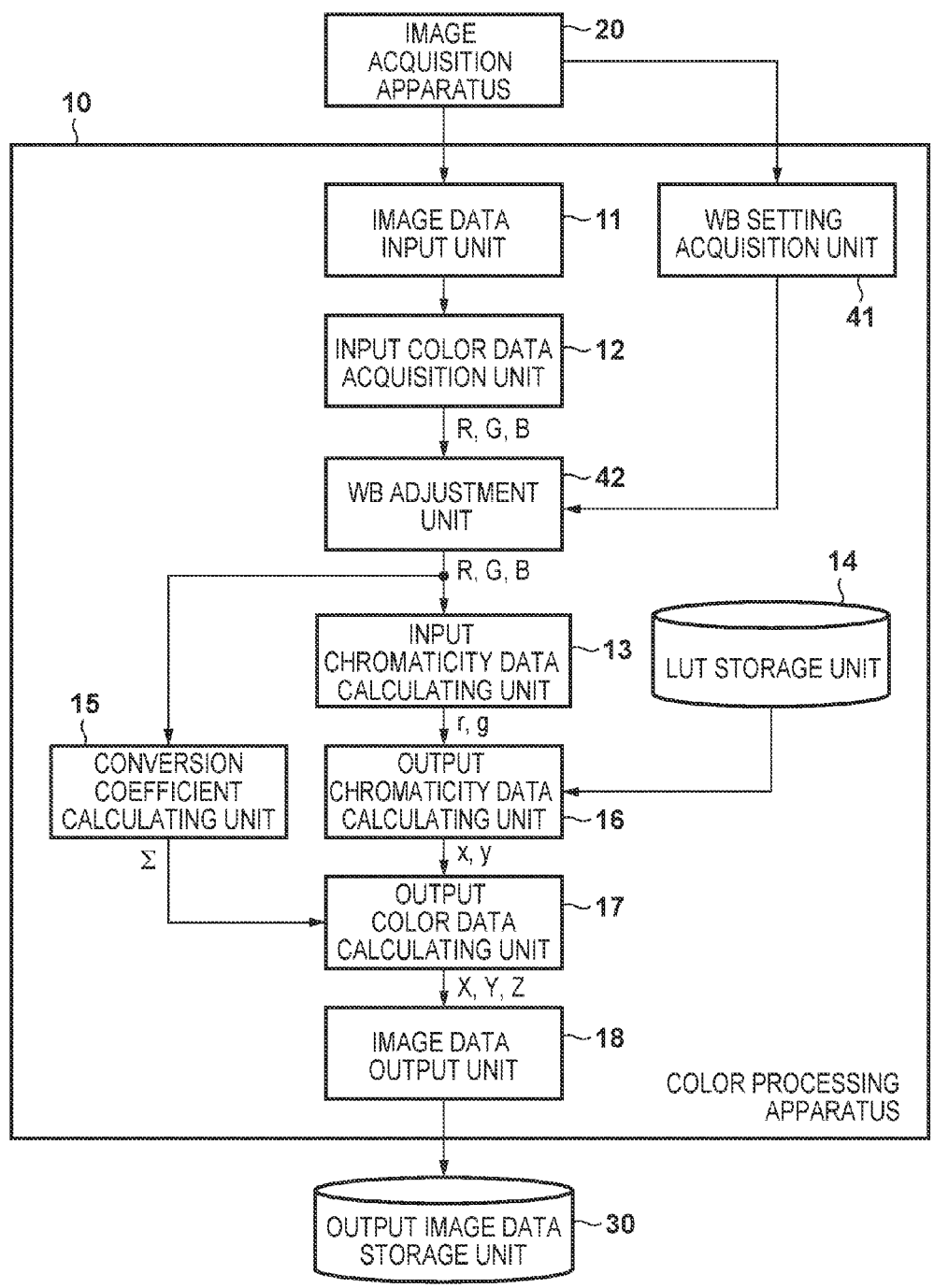
FIG. 8 is a block diagram for explaining an example of the processing arrangement of a color processing apparatus according to the second embodiment.

The second embodiment will describe a method of performing appropriate white balance adjustment processing based on white balance settings set by the user at the time of capturing an image in addition to the color conversion processing according to the first embodiment. An example of the processing arrangement of the color processing apparatus according to the second embodiment will be described with reference to a block diagram shown in FIG. 8. Similarly to the first embodiment, when a CPU 101 shown in FIG. 1 executes a program for color conversion processing, a color processing apparatus 10 shown in FIG. 8 is implemented.

In addition to components shown in FIG. 1, the color processing apparatus 10 according to the second embodiment includes a WB setting acquisition unit 41 for acquiring white balance setting values (to be referred to as WB values hereinafter) set at the time of capturing an image by an image acquisition apparatus 20, and a WB adjustment unit 42 for performing white balance adjustment of input color data based on the WB values.

Figure 9:
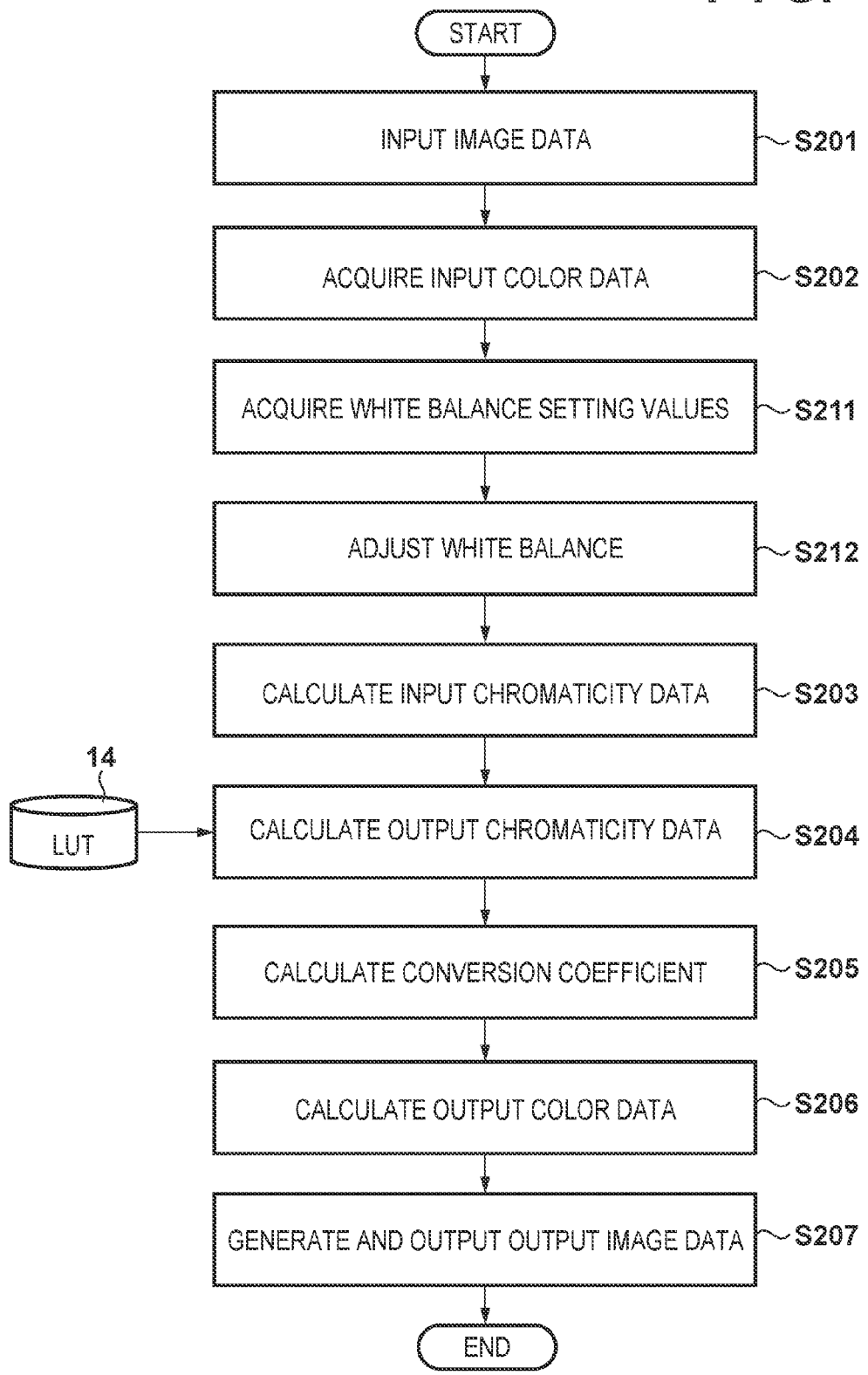
FIG. 9 is a flowchart for explaining color conversion processing executed by the color processing apparatus according to the second embodiment.

Color conversion processing executed by the color processing apparatus 10 according to the second embodiment will be described with reference to a flowchart shown in FIG. 9. Note that processes in steps S201 to S207 are the same as in the first embodiment and a detailed description thereof may be omitted. The WB setting acquisition unit 41 acquires, from the image acquisition apparatus 20, the WB setting values set at the time of capturing image data input by an image data input unit 11 (step S211). The WB adjustment unit 42 outputs color data (Rout, Gout, Bout) obtained by performing white balance adjustment for input color data (Rin, Gin, Bin) acquired by an input color data acquisition unit 12 (step S212) based on:

$$Rout = Rin/Rw;$$

$$Gout = Gin/Gw;$$

$$Bout = Bin/Bw;$$

where Rw, Gw, and Bw represent WB values (RGB values when white data is captured).

The color data output from the WB adjustment unit 42 is input to an input chromaticity data calculating unit 13 and a conversion coefficient calculating unit 15, and subsequent processes (steps S203 to S207) are executed.

Note that the white balance settings acquired by the WB setting acquisition unit 41 may indicate, for example, standard light defined by the International Commission on Illumination (CIE), or information representing the type of illumination light source such as a fluorescent lamp or incandescent lamp. Alternatively, the value of a color temperature may be acquired as the white balance setting.

White balance adjustment based on equations (11) has been explained. However, the present invention is not limited to this. The method is not limited as long as processing equalizes all RGB values when capturing white set by the white balance settings like processing performed in a general digital camera.

As described above, it is possible to perform appropriate white balance adjustment processing based on white balance settings set by the user at the time of capturing an image in addition to the color conversion processing according to the first embodiment, thereby improving the color reproduction accuracy.

[Conversion Accuracy for Standard Light]

The conversion accuracy for the standard light when an LUT 14 is used will be described with reference to FIGS. 10A to 10C. FIG. 10A shows the spectral characteristics (to be referred to as D65 spectral characteristics hereinafter) of the standard light (illuminant D65) defined by the International Commission on Illumination (CIE). FIG. 10B shows rectangular spectral characteristics having tristimulus values almost equal to those (to be referred to as D65 tristimulus values hereinafter) of the illuminant D65. FIG. 10C shows the spectral characteristics of main component spectral data calculated by equations (6) and (7) using main component data shown in FIG. 5B.

A case in which the color filter characteristics of a digital camera do not satisfy router conditions will be considered. If the LUT 14 is created using the rectangular spectral data, RGB values (first input color data) for the D65 spectral characteristics shown in FIG. 10A are largely different from RGB values (second input color data) for the rectangular spectral characteristics shown in FIG. 10B. Therefore, if each of the first and second output color data obtained by processing the first and second input color data is converted into tristimulus values, the difference between the sets of the tristimulus values is large, as a matter of course. In other words, the mean square error between the true D65 tristimulus values and the tristimulus values of the second output color data increases.

On the other hand, RGB values for the spectral characteristics of the main component spectral data shown in FIG. 10C are close to the RGB values (first input color data) for the D65 spectral characteristics shown in FIG. 10A. Therefore, if the LUT 14 created using the main component spectral data is used, the color conversion accuracy when capturing the illuminant D65 is improved, as compared with a case in which an LUT created using only the rectangular spectral data is used.

Furthermore, input color data obtained by capturing the illuminant D65 is acquired, and output color data is obtained by processing the input color data based on the LUT 14, thereby calculating the first mean square error between the tristimulus values of the output color data and the D65 tristimulus values. On the other hand, input color data obtained by capturing a light source having rectangular spectral characteristics with tristimulus values almost equal to the D65 tristimulus values is obtained, and output color data is obtained by processing the input color data based on the LUT 14, thereby calculating the second mean square error between the tristimulus values of the output color data and the D65 tristimulus values. In this case, the first mean square error is smaller than the second mean square error.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-116021, filed Jun. 8, 2015 which is hereby incorporated by reference herein in its entirety.

What is claimed is:

1. A color processing apparatus comprising:
a first convertor configured to convert input color data into input chromaticity data;
a second convertor configured to convert the input chromaticity data into output chromaticity data by referring to a table indicating a correspondence between an input chromaticity and an output chromaticity; and
a third convertor configured to convert the output chromaticity data into output color data using a conversion coefficient calculated from the input color data,
wherein the table indicating the correspondence is created based on spectral data generated by a generation method different for each of a low chroma color and a high chroma color.

2. The apparatus according to claim 1, wherein the correspondence for the high chroma color is acquired based on one of spectral data of single-wavelength spectral light and spectral data having rectangular spectral characteristics.

3. The apparatus according to claim 1, wherein the correspondence for the low chroma color is acquired based on spectral data obtained by a linear sum of a plurality of spectral data.

4. The apparatus according to claim 1, wherein the low chroma color corresponds to a color for which spectral data obtained by a linear sum of a plurality of spectral data takes a value not smaller than zero in a visible light wavelength range.

5. The apparatus according to claim 1, wherein
when tristimulus values of the output color data obtained by processing, based on the correspondence indicated by the table, the input color data obtained by capturing an illuminant D65 are set as first tristimulus values, and tristimulus values of the output color data obtained by processing, based on the correspondence indicated by the table, the input color data obtained by capturing a light source of rectangular spectral characteristics having tristimulus values substantially equal to tristimulus values of the illuminant D65 are set as second tristimulus values,
a mean square error between the first tristimulus values and the tristimulus values of the illuminant D65 is smaller than a mean square error between the second tristimulus values and the tristimulus values of the illuminant D65.

6. The apparatus according to claim 1, further comprising:
an acquisition unit configured to acquire a white balance setting when acquiring the input color data; and an adjustment unit configured to perform white balance adjustment of the input color data before conversion by the first convertor.

7. A color processing method comprising:
converting input color data into input chromaticity data;
converting the input chromaticity data into output chromaticity data by referring to a table indicating a correspondence between an input chromaticity and an output chromaticity; and
converting the output chromaticity data into output color data using a conversion coefficient calculated from the input color data,
wherein the table indicating the correspondence is created based on spectral data generated by a generation method different for each of a low chroma color and a high chroma color.

8. A non-transitory computer-readable storage medium storing a program which causes a computer to perform a color processing method, the method comprising:
converting input color data into input chromaticity data;
converting the input chromaticity data into output chromaticity data by referring to a table indicating a correspondence between an input chromaticity and an output chromaticity; and
converting the output chromaticity data into output color data using a conversion coefficient calculated from the input color data,
wherein the table indicating the correspondence is created based on spectral data generated by a generation method different for each of a low chroma color and a high chroma color.

9. A color processing method of creating a table indicating a correspondence between an input chromaticity and an output chromaticity, comprising:
generating rectangular spectral data based on parameters indicating rectangular spectral characteristics;
calculating tristimulus values of the rectangular spectral data;
calculating main component coefficients for obtaining spectral data having tristimulus values equal to the tristimulus values of the rectangular spectral data by a linear sum of main component data obtained by performing main component analysis for a plurality of spectral data;
generating main component spectral data by calculating a linear sum of the main component data based on the main component coefficients;
calculating color data based on color filter characteristics of an image input device and one of the rectangular spectral data and the main component spectral data;
calculating chromaticity data as input chromaticity data from the color data;
calculating chromaticity data as output chromaticity data from the tristimulus values; and
storing the input chromaticity data and the output chromaticity data in the table in association with each other.

10. The method according to claim 9, wherein if the main component spectral data takes a negative value in a visible light wavelength range, the rectangular spectral data is used to calculate the color data.

11. The method according to claim 9, further comprising:
determining whether a correspondence between the input chromaticity data and the output chromaticity data has been acquired for all pairs of dominant wavelengths and predetermined wavelength widths; and
repeating, if there is a pair of the dominant wavelength and the wavelength width for which the correspondence has not been acquired yet, the generation of the rectangular spectral data, the calculation of the tristimulus values, the calculation of the main component coefficients, the generation of the main component spectral data, the calculation of the color data, the calculation of the input chromaticity data, the calculation of the output chromaticity data, and the storage by changing the parameters.

12. A color processing apparatus for creating a table indicating a correspondence between an input chromaticity and an output chromaticity, comprising:
a first generation unit configured to generate rectangular spectral data based on parameters indicating rectangular spectral characteristics;
a first calculating unit configured to calculate tristimulus values of the rectangular spectral data;
a second calculating unit configured to calculate main component coefficients for obtaining spectral data having tristimulus values equal to the tristimulus values of the rectangular spectral data by a linear sum of main component data obtained by performing main component analysis for a plurality of spectral data;
a second generation unit configured to generate main component spectral data by calculating a linear sum of the main component data based on the main component coefficients;
a third calculating unit configured to calculate color data based on color filter characteristics of an image input device and one of the rectangular spectral data and the main component spectral data;
a fourth calculating unit configured to calculate chromaticity data as input chromaticity data from the color data;
a fifth calculating unit configured to calculate chromaticity data as output chromaticity data from the tristimulus values; and
a storage unit configured to store the input chromaticity data and the output chromaticity data in the table in association with each other.

13. A non-transitory computer-readable storage medium storing a program which causes a computer to perform a color processing method of creating a table indicating a correspondence between an input chromaticity and an output chromaticity, the method comprising:
generating rectangular spectral data based on parameters indicating rectangular spectral characteristics;
calculating tristimulus values of the rectangular spectral data;
calculating main component coefficients for obtaining spectral data having tristimulus values equal to the tristimulus values of the rectangular spectral data by a linear sum of main component data obtained by performing main component analysis for a plurality of spectral data;
generating main component spectral data by calculating a linear sum of the main component data based on the main component coefficients;
calculating color data based on color filter characteristics of an image input device and one of the rectangular spectral data and the main component spectral data;
calculating chromaticity data as input chromaticity data from the color data;
calculating chromaticity data as output chromaticity data from the tristimulus values; and storing the input chromaticity data and the output chromaticity data in the table in association with each other.

\* \* \* \* \*